Figure 1:
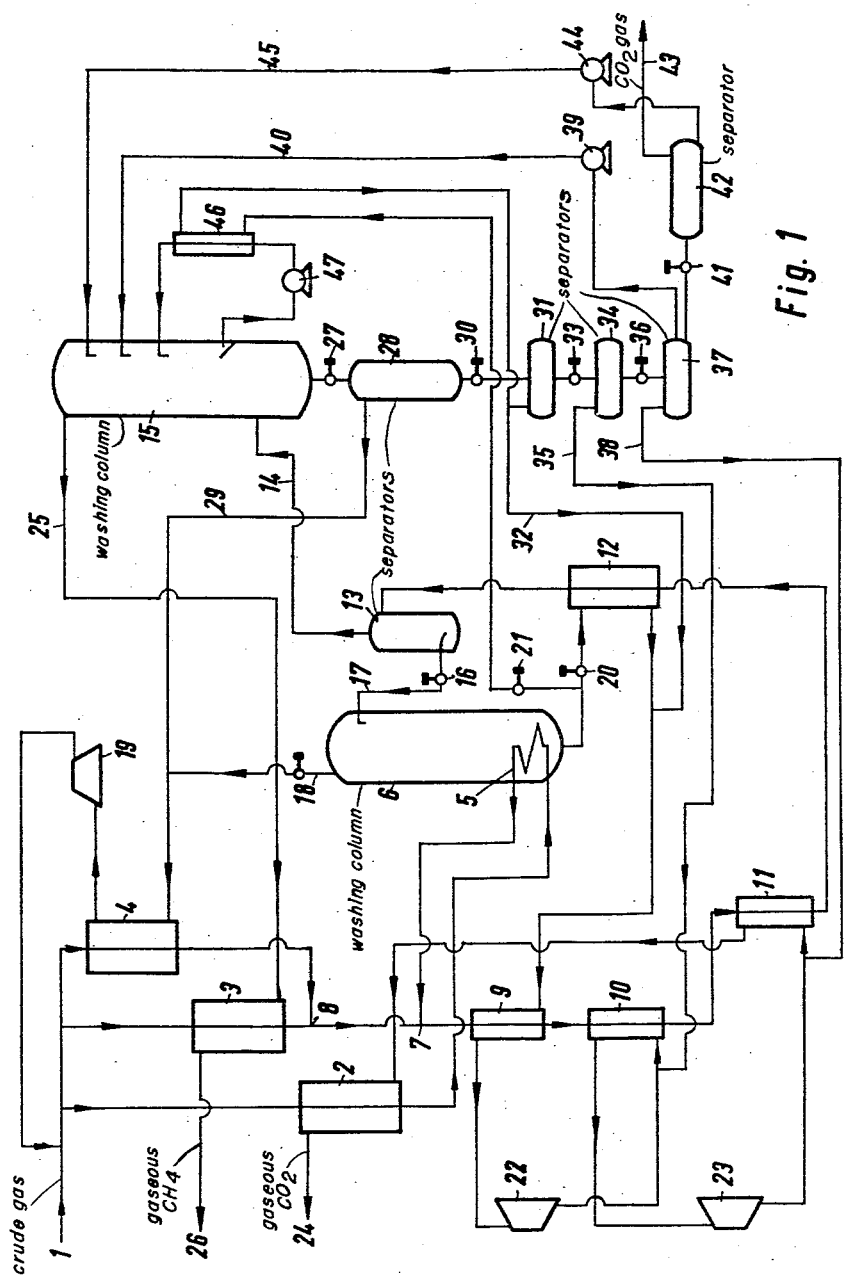

INVENTOR:
RUDOLF BECKER 3,130,026
METHOD AND APPARATUS FOR THE SEPARATION OF CARBON DIOXIDE FROM COMPRESSED GASES
Rudolf Becker, Munich-Solln, Germany, assignor to Gesellschaft für Linde's Eismaschinen Aktiengesellschaft, Hollriegelskreuth, near Munich, Germany, a German company
Filed Sept. 26, 1960, Ser. No. 58,314
Claims priority, application Germany Sept. 30, 1959
9 Claims. (Cl. 62—17)

This invention concerns a process and an apparatus for separating carbon dioxide from pressure gases having a high carbon dioxide content by liquefying the carbon dioxide and gaining work by the subsequent evaporation and work-producing expansion of the carbon dioxide.

Several processes are known for separating $CO_2$ from gas mixtures. To these belong first of all the chemical and physical washing processes; then too, the liquefaction of carbon dioxide by the application of pressure and low temperature. For the latter method it is necessary that the pressure and temperature conditions in the gas mixture be such that the carbon dioxide is above its triple point at its partial pressure. A part thereof is then precipitated in liquid form.

Particularly from gas mixtures which are under elevated pressure—for example, over 25 atmospheres absolute—and which have a high carbon dioxide content of over 25% for example, it is thus possible to separate a large amount of $CO_2$. Cases wherein the carbon dioxide is found in such high concentrations and where the $CO_2$ must be separated before the further processing, are, for example, converter gas and natural gas.

An object of the present invention is to separate the $CO_2$ from these gases with the lowest possible energy expenditure.

This is achieved, according to the invention, by a method for separating carbon dioxide from pressure gas having a high carbon dioxide content by liquefying the carbon dioxide by cooling. It is characterized in that the separated liquid carbon dioxide is evaporated after the separation above the triplet point, superheated and subsequently expanded to produce work.

The special advantage of this method is that, due to the work-producing expansion of the separated and re-evaporated carbon dioxide, not only is the energy of the low-temperature production for the separating process covered, but also, under certain circumstances, even an energy excess is achieved.

In the method according to the invention the incoming crude gas is cooled, preferably by indirect heat-exchange; subsequently, a part of the carbon dioxide contained in the gas mixture is liquefied by a further heat-exchange; the part that remains gaseous is separated in a separator and conducted to another purifying stage, preferably, a chemical or physical washing process, while the liquefied portion is conducted to a purifying column to separate the remaining extraneous gases. From the base of this column is discharged liquid $CO_2$, which is evaporated by heat-exchange preferably with condensing gas, is superheated, and expanded to produce work in an expansion machine, preferably, an expansion turbine. The expanded cold gas is heated again by indirect heat-exchange, for example, with incoming gas to be decomposed, or with gas from which a part or the entire $CO_2$ has already been withdrawn, and leaves the plant at ambient temperature.

According to a special design of the subject of the invention the expansion of the gaseous carbon dioxide can be effected in several stages. The gas, which is expanded and cooled in one stage, is heated again in heat exchange with incoming gas to be decomposed or with gas from which a part or the entire $CO_2$ has already been withdrawn, and leaves the plant with ambient temperature.

According to a special development of the subject of the invention the expansion of the gaseous carbon dioxide can be effected in several stages. The gas, which is expanded and cooled in one stage, is heated again in heat-exchange with incoming gas to be decomposed or with gas from which a part or the entire $CO_2$ has already been withdrawn, and then is conducted to the next expansion stage.

It is possible to effect the expansion—or, the last expansion, in the case of several expansion stages—into a vacuum. It is then necessary, however, to suck off the expanded carbon dioxide with expenditure of energy.

In order to lower the expansion temperature, an inert gas, for example, air can be added to the carbon dioxide. This effects a reduction of the partial pressure of the carbon dioxide. The end temperature of the expansion can be selected lower without solid carbon dioxide being obtained in the expanded gas. If necessary, the inert gas can be purified, preferably in regenerators, before it is added.

Since only a part of the total carbon dioxide can be removed by the above described method, it is advisable to add another purifying stage. To this end there can be used one or another of a variety of chemical or physical washing processes. It is particularly expedient to include a low-temperature washing plant in the complete layout.

If this low-temperature washing plant works with a strip gas to expel the carbon dioxide from the solvent, this strip gas can be added, in order to dilute the carbon dioxide, before the last expansion stage or stages of the turbine, so as to reduce the dew point of the carbon dioxide.

Figure 2:
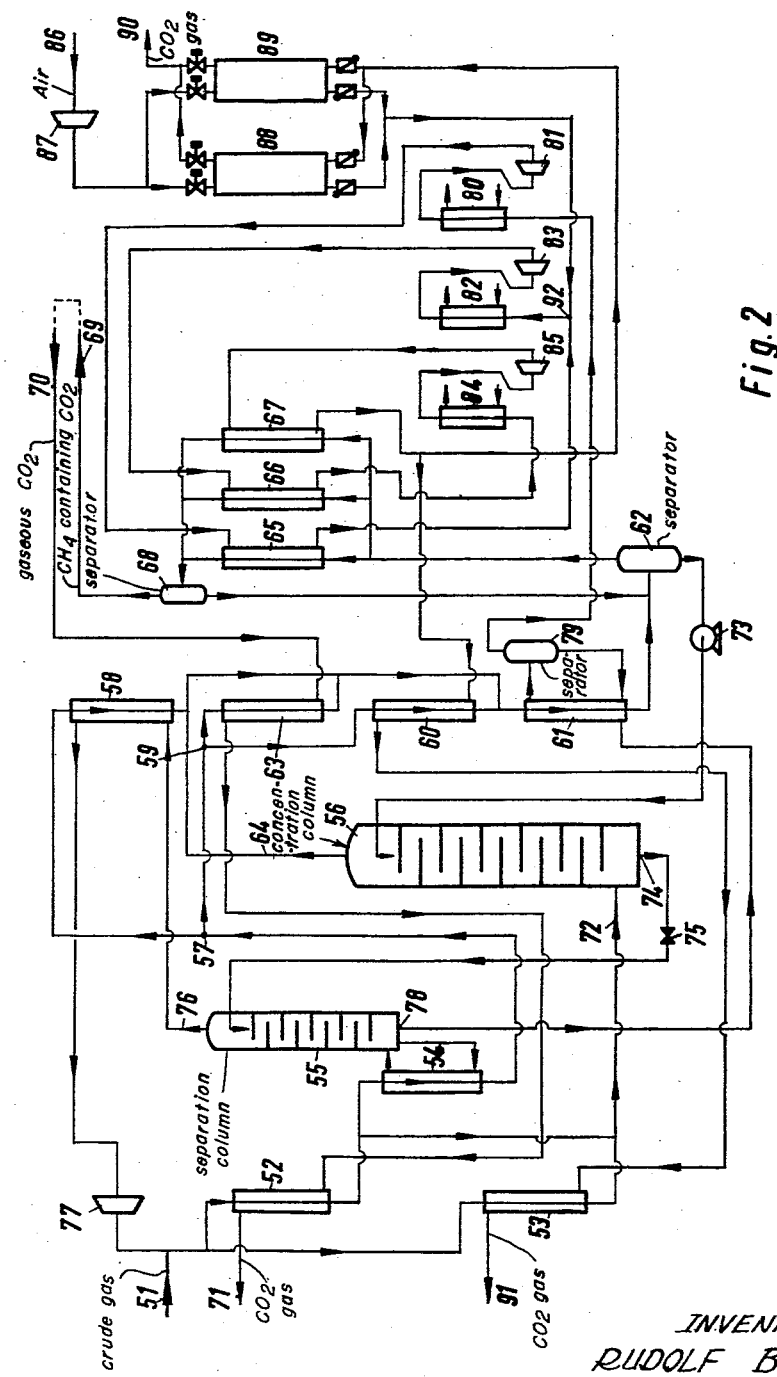

Apparatus for carrying out the process according to the invention are represented schematically in FIGURES 1 and 2 of the accompanying drawing:

FIG. 1 represents a plant wherein the gaseous carbon dioxide is expanded in two stages. About 135,000 Nm.³/h. (cubic meters, measured under normal conditions of temperature and pressure, per hour) crude gas flow into the plant at 1, with a pressure of about 47 atmospheres absolute and a temperature of about 300° K. The current divides into three partial currents, which latter flow through the heat-exchangers 2, 3 and 4. The partial current passing through the heat-exchanger 2 is cooled by the carbon dioxide leaving the plant to about 259° K., and is conducted through the spiral tubes of the washing column 6. A part of the carbon dioxide condenses at about 246° K. The gas current combines at 7 with the partial current which has passed through the heat-exchanger 3, to which the partial current traversing the heat-exchanger 4 had been added at 8. After further cooling in heat-exchangers 9, 10, 11 and 12, the gas mixture has still a temperature of about 230° K., at which temperature a great portion of the carbon dioxide is present in liquid form and is separated from the gaseous portion in a separator 13.

This gaseous portion, which still contains about 28% $CO_2$, is fed through a conduit 14 to a washing column 15, where the gas is washed with methanol. The liquid portion, separated in the separator 13, is expanded through a valve 16 to about 13 atmospheres and is fed through a conduit 17 to the column 6. A gas mixture which still contains about 50% $CO_2$ is withdrawn from the head of the column through the conduit 18, is conducted through the heat-exchanger 4, is subsequently compressed in a compressor 19 to the starting pressure, and is added again to the conduit 1.

The liquid carbon dioxide accumulating in the base of the column 6 is partly expanded through a valve 20 to about 6 atmospheres absolute, is conducted through the heat-exchangers 12 and 9 where it is evaporated and heated, and is expanded in a first turbine 22; the gas enters turbine 22 at about 243° K. and at 6 atmospheres absolute, and is expanded to 2.8 atmospheres absolute, by which the temperature of the gas is lowered to about 215° K. Subsequently, it is conducted through the heat-exchanger 10, where it is heated to about 240° K., and then is expanded in an expansion turbine 23 to about 1.2 atmospheres absolute, and conducted through the heat-exchangers 11 and 2. About 71,000 Nm.$^3$/h. $CO_2$ can be withdrawn at 24, at ambient temperature.

In the washing column 15 the gas mixture, which leaves the separator 13 with a $CO_2$-content of about 28%, is washed with methanol. Pure methane at a temperature of about 200° K., is withdrawn from the head of the column through a conduit 25, and is conducted through the heat exchanger 3. About 61,870 Nm.$^3$/h. methane leaves the plant at 26, at ambient temperature and at a pressure of about 45 atmospheres absolute.

The $CO_2$-containing wash liquor is withdrawn from the column 15, is expanded through a valve 27 to about 13 atmospheres absolute, and is fed to a separator 28. About 14,500 Nm.$^3$/h. gas with a content of about 50% $CO_2$ is withdrawn from the head of the separator, and is conducted through a conduit 29 to conduit 18 and thus to the heat-exchanger 4. The wash liquor from the separator 28 is expanded through a valve 30 to about 6 atmospheres absolute and is fed to another separator 31 where additional $CO_2$ is separated and conducted through a conduit 32 to the heat-exchanger 9. The separator 31 can be designed as a stripping column into which an inert gas—for example, nitrogen—is introduced, which is subsequently expanded together with the expelled carbon dioxide. The remaining wash liquor is expanded through a valve 33 to about 2.8 atmospheres absolute, and is fed to a separator 34 where again a part of the carbon dioxide is separated and fed through conduit 35 to the heat-exchanger 10. The wash liquor is then again expanded through a valve 36 and fed to a separator 37, from which latter gaseous $CO_2$ is again withdrawn through a conduit 38 and fed to the heat-exchanger 11. A part of the wash liquor is delivered, by a pump 39, through a conduit 40 into the wash column 15, whilst another part is expanded through a valve 41 to about 0.5 atmosphere absolute, and is fed to a separator 42 from which latter a vacuum pump withdraws, at 43, about 2,130 Nm.$^3$/h. gaseous carbon dioxide. The pure wash liquor is fed by a pump 44 and conduit 45 to the head of the wash column 15. A pump 47 returns the wash liquor from the column 15 over a heat-exchanger 46 into this column.

FIG. 2 represents a plant wherein the gaseous $CO_2$ is expanded in three stages, which plant also has a concentration column 56 in addition to the separation column 55. In order to obtain a higher purity of the end product, the expansion temperature is reduced in this plant by the addition of air as an inert gas. To this end an additional air circuit with regenerator is provided.

The $CO_2$-containing gas is introduced into the plant at 51, for example, at a pressure at 45 atmospheres absolute. One part flows through a heat-exchanger 53 directly to the concentration column 56, whilst the other part is cooled in a heat-exchanger 52, is then divided again and one part is conducted, together with the gas arriving from heat-exchanger 53, to the concentration column 56; the other part flows through heat-exchanger 54 and divides at 57 into a part which flows through a heat-exchanger 58 while the other partial current divides again at 59. One part is conducted from here through heat-exchangers 60 and 61 to a separator 62, while the other partial current traverses a heat-exchanger 63, combines subsequently with the gas withdrawn, through conduit 64, from the head of column 56, and is then added between heat-exchangers 60 and 61 to the above-mentioned gas current. In the heat-exchanger 61 the gas attains a temperature at which the $CO_2$ liquefies.

The gaseous portion is withdrawn from the separator 62 and is divided into three parallel partial currents, which pass through heat-exchangers 65, 66 and 67 where they are further cooled by expanded carbon dioxide gas, with additional carbon dioxide being condensed in liquid form. Subsequently, the three partial currents are combined again, and the re-combined current is fed to another separator 68. Gaseous methane with a content of about 15% carbon dioxide can be withdrawn from separator 68 through a conduit 69 and fed to a wash column, preferably, a low-temperature washing plant such as is represented in FIG. 1. The gas purified in this plant returns through a conduit 70, is heated successively in the heat-exchangers 63 and 52, and leaves the plant at 71. If the plant is to be operated without subsequent washing, the conduits 69 and 70 are to be connected as indicated by the broken line. After washing, the gas still contains about 5% $CO_2$ if the wash liquor is regenerated under normal pressure. With the application of subatmospheric pressure it contains only about 2.5% $CO_2$.

From the crude gas supplied through conduit 72 a part of the carbon dioxide is separated in liquid form in the column 56. The remaining gaseous portion is washed with liquid carbon dioxide, which is taken from the separator 62 and delivered by a pump 73 to the column 56. The cold wash liquor, which contains little methane, is enriched with methane by the crude gas arriving in this column through conduit 72.

Liquid, methane-containing, carbon dioxide is withdrawn from the column at 74, is expanded through a valve 75, and fed to the rectifying column 55. The $CO_2$-containing gas mixture leaving from the head of the column at 76 is heated in the heat-exchanger 58, compressed in a compressor 77 and combined with a crude gas flowing to the plant at 51. The sump of column 55 is heated by the heat-exchanger 54 acting as a circulation heater. Liquid carbon dioxide is withdrawn at 78, is evaporated in the heat-exchanger 61 and fed to a separator 79 from whence the liquid portion is returned again to the heat-exchanger 61 whilst the gaseous portion is heated in a heat-exchanger 80, with water or air, and is fed to an expansion turbine 81. After the work-producing expansion, the gas is first heated again in the heat-exchanger 65, then in a heat-exchanger 82, and is expanded again in a turbine 83, after which the gas is heated again in the heat-exchangers 66 and 84 and expanded again in a work-producing manner in a turbine 85.

After leaving turbine 85, the gas is conducted through heat-exchanger 67, and is then divided into a first portion, which passes successively through the heat-exchangers 60 and 53 and leaves the plant at 91, and a second portion which flows through the regenerator 89 and leaves the plant at 90.

This latter partial current is only necessary when, as in the represented case, air is added to the expanded carbon dioxide in order to reduce its partial pressure. This is effected in the above plant in that the air—which is supplied through line 86—is compressed in a compressor 87, cooled in a regenerator 88 and added at point 92 to the $CO_2$ to be expanded.

The addition of air has the effect that the gas leaving the plant is not pure carbon dioxide, but a carbon dioxide-air mixture.

If the addition of air is foregone, the parts 86, 87, 88, 89, 90 can be omitted. The $CO_2$ content of the gas withdrawn at 69 will then be about 18%.

I claim:

1. Process for separating carbon dioxide from a crude gas mixture having a high carbon dioxide content which comprises liquefying the carbon dioxide by cooling under a pressure above the triple point, separating the resulting liquid carbon dioxide from the residual gases, superheating and subsequently work-producingly expanding it in several stages, the carbon dioxide being heated by indirect heat-exchange, before each expansion stage, with a gas which has been at least partly freed from carbon dioxide.

2. Process for separating carbon dioxide from a crude gas mixture having a high carbon dioxide content which comprises cooling and rectifying the crude gas mixture under a pressure above the triple point to produce liquid carbon dioxide and a residual gas mixture, evaporating and super-heating the liquid carbon dioxide, and subsequently work-producingly expanding it in several stages, heating the carbon dioxide by indirect heat-exchange before each expansion stage with a gas which has been at least partly freed from carbon dioxide.

3. Process for separating carbon dioxide from a crude gas mixture having a high carbon dioxide content which comprises washing the crude gases with an absorption liquid to produce a residual gas and a rich absorption liquid, stripping the rich absorption liquid with an inert gas, preferably nitrogen, in several stages operating under different pressures whereby to produce gas mixtures containing inert gas and carbon dioxide under different pressures, and work-producingly expanding the gas mixture withdrawn from each stripping stage in several stages, each gas mixture being heated by indirect heat-exchange before each expansion stage.

4. Process for separating carbon dioxide from a crude gas mixture having a high carbon dioxide content which comprises producing liquid carbon dioxide by cooling and rectifying the crude gas mixture under a pressure above the triple point, evaporating and superheating the carbon dioxide and subsequently work-producingly expanding it in several stages, the carbon dioxide being heated before each expansion stage, and conducting an inert gas, preferably nitrogen, to the carbon dioxide to heat the carbon dioxide and to reduce the partial pressure of the carbon dioxide, the inert gas being expanded together with the carbon dioxide.

5. Process for separating carbon dioxide from a crude gas mixture having a high carbon dioxide content which comprises producing liquid carbon dioxide by cooling and rectifying the crude gas mixture under a pressure above the triple point, evaporating and superheating the carbon dioxide and subsequently work-producingly expanding it in several stages, the carbon dioxide being heated before each expansion stage, conducting an inert gas such as air through reversing heat-exchangers or regenerators to the carbon dioxide to heat the carbon dioxide and to reduce the partial pressure of the carbon dioxide thereby preventing the refrigeration of the carbon dioxide, expanding the inert gas together with the carbon dioxide and conducting at least a part of the expanded gases through said reversing heat-exchangers or regenerators in counterflow to the incoming inert gas.

6. Process for separating carbon dioxide from a crude gas mixture having a high carbon dioxide content which comprises partly liquefying the crude gas mixture by cooling under a pressure above the triple point, separating the liquid-rich part enriched with carbon dioxide from the part rich in mixed gases, rectifying the liquid-rich part as reflux in counter-current with carbon dioxide gas to produce liquid carbon dioxide and an intermediate gas, evaporating the liquid carbon dioxide, under a pressure above the triple point, superheating and subsequently work-producingly expanding it in several stages, the intermediate gas being heated in counter-current with crude gas, compressing said intermediate gas and returning it to the crude gas to be separated, passing the part rich in mixed gases through an absorption zone to produce residual gases and a rich absorber liquid, withdrawing the residual gases from the absorption zone, and heating the residual gases in counter-current to the crude gas mixture, stripping the rich absorber liquid with an inert gas preferably nitrogen, in several stages operating under different pressures, to produce gas mixtures containing inert gas and carbon dioxide, work-producingly expanding the gas mixture withdrawn from each stripping stage corresponding to the pressure in several stages each gas mixture being heated indirectly before each expansion stage.

7. Process for separating carbon dioxide from a crude gas mixture having a high carbon dioxide content which comprises cooling the crude gas mixture to a temperature above the boiling point under a pressure above the triple point, rectifying the crude gases in two separation stages operating under different pressures but above the triple point to produce liquid carbon dioxide and an intermediate gas and a residual gas, evaporating the carbon dioxide in counter-current heat-exchange with the residual gas to produce (1) a liquid part of the residual gas to be used as reflux in the first separation stage and (2) a gaseous part to be used for heating gases to be expanded in several stages and for heating the crude gas mixture, superheating the carbon dioxide, and expanding it in several stages, the carbon dioxide being indirectly heated by the gaseous part of the residual gas, heating the intermediate gas in counter-current heat-exchange with crude gas to be separated, compressing said intermediate gas and returning it to the crude gas to be separated.

8. Process defined in claim 7, in which an inert gas, such as air, is conducted through reversing heat-exchangers or regenerators to the carbon dioxide to heat the latter and to reduce the partial pressure of the latter thereby preventing the refrigeration of the carbon dioxide, and in which the inert gas is expanded with the carbon dioxide, at least a part of the expanded gases being conducted through said reversing heat-exchangers or regenerators in counterflow to the incoming inert gas.

9. Process for separating carbon dioxide from a crude gas mixture having a high carbon dioxide content which comprises liquefying the carbon dioxide by cooling under a pressure above the triple point, separating the resulting liquid carbon dioxide from the residual gases, superheating and subsequently work-producingly expanding it, in several stages, into a partial vacuum, the carbon dioxide being heated by indirect heat-exchange, before each expansion stage, with a gas which has been at least partly freed from carbon dioxide.

References Cited in the file of this patent

UNITED STATES PATENTS

| | | |
|---|---|---|
| 2,134,699 | Brewster | Nov. 1, 1938 |
| 2,838,918 | Becker et al. | June 17, 1958 |
| 2,880,591 | Kwauk | Apr. 7, 1959 |
| 2,940,270 | Palazzo et al. | June 14, 1960 |
| 3,001,373 | Du Bois Eastman et al. | Sept. 26, 1961 |